Patented May 10, 1932

1,857,429

UNITED STATES PATENT OFFICE

LEO M. CHRISTENSEN, OF TERRE HAUTE, INDIANA, ASSIGNOR TO COMMERCIAL SOLVENTS CORPORATION, OF TERRE HAUTE, INDIANA, A CORPORATION OF MARYLAND

FERMENTATION OF CELLULOSIC MATERIALS

No Drawing. Application filed October 21, 1929. Serial No. 401,385.

My invention relates to the production of such materials as acetic and butyric acids, ethyl alcohol, methane, hydrogen, carbon dioxide and other useful products by the fermentation of cellulosic materials. More particularly, my invention relates to the fermentation in such a process, of cellulosic material resulting from the treatment of corncobs and other cellulosic materials with acids for the production of sugars.

In United States Patents Nos. 1,443,881, 1,602,306, and 1,639,571, Herbert Langwell has described methods of fermenting cellulosic material by the aid of thermophilic bacteria which produce acetic and butyric acids, ethyl alcohol, and gases such as carbon dioxide, methane, and hydrogen. According to the method described in these patents, a mash is prepared from some comminuted form of cellulosic material such as, for example, corncobs. This mash is then inoculated with a mixture of organisms capable of producing acetic and butyric acids and of the character ordinarily found in almost any form of fermenting vegetable matter, stable manure, pond mud, septic sewage, tank mud, soil, etc. These organisms are usually found in the intestinal tracts of cellulose-consuming animals, and accordingly a convenient form of inoculum is obtained by selecting material from the center of a steaming stable manure heap or from such other source as is most convenient or suitable. Since these organisms are also usually found on corncobs, it is possible, if desired, to make use of the thermophilic bacteria naturally occurring in the corncobs as the means of inoculating the mash. After inoculation, fermentation is allowed to take place at temperatures ranging from 45° to 70° C., but preferably at temperatures in the neighborhood of 60° C.

Like all protoplasmic bodies, bacteria consist of carbon, oxygen, hydrogen, and nitrogen, together with inorganic salts and varying quantities of phosphorus and sulfur. In order that bacteria may develop and multiply, therefore, they must be supplied with these substances in proper quantities and in suitable form for assimilation. The first three materials named are present in the cellulose used as the raw material. Certain of the other required materials are usually present in small but insufficient quantities with the raw material used as the source of the cellulosic material. These necessary nutrients are usually supplied in the form of varying proportions of such materials as potassium sulphate, sodium phosphate, ammonium chloride, ammonium sulphate, potassium chloride, distilling wastes such as slops from the butyl-acetonic fermentation process, "steep water", etc.

It has been found that, in general, bacteria which produce acids during the course of a fermentation become less and less active as the concentration of acid in the medium increases. After a certain point is reached, the action of the bacteria becomes negligible unless the acid is removed from the medium. Such a condition is not met with in the present case. Langwell, in the patents cited above, has recommended that the hydrogen ion concentration of the fermenting medium be maintained within the limits of about pH 5.0–pH 9.0 measured in the bulk of the mash by the employment of (a) oxides, hydroxides, carbonates or bicarbonates of alkali metals, including ammonium, or (b) oxides, hydroxides, carbonates or bicarbonates of alkaline earth metals, including magnesium, in which cases compounds of alkali metals which cause the formation of insoluble alkaline earth metal compounds are added from time to time. It is preferred to follow the procedure outlined under (a) in which case it is necessary to make small additions of the neutralizing agent at intervals thruout the course of the fermentation. Whatever method is resorted to, the mash should be agitated at frequent intervals or at least after each addition of neutralizing agent.

In any fermentation process the cost of the raw materials used is one of the most important factors governing the economic success of the process. For the purpose of attempting to reduce the cost of raw materials which could be used in the production of acetic and butyric acids and other useful products by the fermentation of cellulosic materials with thermophilic bacteria, various forms of naturally occurring cellulosic material as well as waste materials from other processes have been investigated. In many cases it has formerly not been found possible to ferment this latter type of material with satisfactory yields for various reasons. A material of this character is that sometimes designated as "xylose residue," a cellulosic material containing a relatively high proportion of ligneous material and which is obtained from the acid digestion of xylose-containing materials, after the xylose-containing supernatant liquor has been drawn off and the residue washed substantially free from xylose.

The exact chemical structure of neither cellulose nor cellulose-containing materials is known. It is fairly well established, however, that in different forms of vegetation the cellulose occurs in somewhat different structural forms, for example, $\alpha$, $\beta$, and $\gamma$ cellulose, lignocellulose, pectocellulose, hemicellulose, etc. Attempts have been made to utilize these different forms of cellulose in many different ways. Much attention has been devoted to hydrolyzing various forms of cellulosic material to pentoses such as xylose. This is accomplished, for example, by treating cellulosic materials such as corncobs, corn stalks, sawdust, straw, etc. with a dilute acid such as sulphuric acid, either at ordinary or at elevated temperatures. From corncobs yields of xylose as high as 25–30% may be obtained under favorable conditions, the xylose being formed from the more reactive portions of the cellulose. The more resistant forms of the cellulose may, if desired, be converted to cellobiose, glucose, or polymers of glucose by treatment with concentrated acid. Treating fresh cellulosic material with concentrated acid, however, appears to destroy that portion of this material giving xylose, and little or none of the latter material is obtained. Hence it results that in manufacturing pentoses such as xylose, appreciable amounts of cellulosic materials are left in the solid material remaining at the end of the operation. At the same time, however, the proportions of other unhydrolyzable materials are materially increased. In the commercial production of xylose, for example, by treating corncob meal with hot dilute sulfuric acid, the amount of lignin in the residue amounts to about 48% as compared to about 35% in the untreated material.

Many attempts have been made to ferment this cellulose-containing residue from the manufacture of xylose, as disclosed above for the production of acetic acid and butyric acids and other useful products by fermentation with thermophilic bacteria. For some unknown reason, however, the yields based on the amount of cellulose known to be present were uniformly appreciably lower than the results obtained from cellulosic material, which had not previously been subjected to the hydrolyzing treatment.

I have now discovered that the former disadvantages inherent in the use of xylose residue as a raw material for use in cellulosic fermentation processes may be satisfactorily overcome by fermentating said material with varying amounts of another form of untreated cellulosic material, namely, ground corn stalks. The example cited below will serve as an illustration of my new process.

Xylose residue containing approximately 50% cellulosic matter and obtained by treating corncob meal with dilute sulfuric acid was used as the raw material. As shown in the table given below, varying amounts of this xylose residue and ground corn stalks were used as the raw material in making up the media. In each case the medium contained a total of 6.0 grams of indicated cellulosic matter from the two sources. To this cellulosic material was then added sufficient waste distillery slop from the butyl-acetonic fermentation process to make the mash up to 100 c. c. volume. This mash was then inoculated with 2 c. c. of inoculum containing thermophilic bacteria obtained from goat fecal matter and allowed to ferment at approximately 60° C. The hydrogen ion concentration was maintained at a value of pH=7.3 by the daily addition of sodium bicarbonate. The following results show the effect of the addition of varying quantities of ground corn stalks to the xylose residue.

Table

| Xylose residue replaced by corn stalks—% by weight | Volatile acid as acetic G/100 G dry material | | |
|---|---|---|---|
| | 5 days | 7 days | 10 days |
| 0 | 18.8 | 23.7 | 25.8 |
| 10 | 22.0 | 27.7 | |
| 20 | 20.7 | 25.8 | 28.8 |
| 30 | 22.0 | 26.8 | 29.4 |
| 40 | 26.5 | 30.5 | 30.2 |
| 50 | 26.5 | 29.9 | 32.5 |
| 60 | 26.8 | 30.6 | 33.1 |
| 70 | 26.8 | 29.3 | 32.6 |
| 80 | 26.2 | 29.8 | 31.0 |
| 90 | 26.6 | 30.1 | 30.3 |
| 100 | 27.0 | 29.7 | 29.6 |

As shown by the above figures, the substitution of cellulose in the form of ground corn stalks for part of the cellulose in the form of xylose residue results in very marked improvement in the amounts of total acids produced in a given period of time. It should be distinctly pointed out also that this increased production is not due to the fact that cellulose in the form of corn stalks is better suited for use in such fermentation processes since distinctly better results appear to be obtained when about 40–80% of ground corn stalks are substituted for xylose residue with an optimum at approximately 60% substitution. When either greater or lesser quantities of ground corn stalks are used somewhat poorer results are obtained.

It is distinctly understood, of course, that I desire to claim the equivalents of the specific steps outlined in the example cited above that would occur to one skilled in the art. For example, instead of carrying out the fermentation at 60° C., I may employ temperatures ranging from about 45° C. to about 70° C. Instead of employing sodium bicarbonate as the neutralizing agent I may use any of the other neutralizing agents disclosed in United States Patents Nos. 1,443,881, 1,602,306, and 1,639,571, hereinabove cited. Likewise, the hydrogen ion concentration may be maintained between the limits of pH 5.0 and pH 9.0, instead of at pH 7.3.

As the required nutrients I may use either inorganic nutrients of the character disclosed in the above-mentioned United States patents, or distillery wastes such as butyl-acetonic fermentation slops, yeast water, etc., or materials such as concentrated "steep water".

In the appended claims the inoculum for the fermentable mash is defined as "acid-producing thermophilic bacteria", and this term is used to describe all organisms, or mixtures thereof, capable of producing acetic and butyric acids and other useful products by the fermentation of cellulosic materials as hereinbefore described.

While I prefer to use corn stalks which have been ground to a fairly small size, it is distinctly understood that any macerated form is satisfactory so long as it can be suitably incorporated into the mash.

What I claim as new and novel is:

1. In a process for the fermentation of cellulosic materials, the step which comprises inoculating a fermentable mash containing xylose residue and corn stalks with acid-producing thermophilic bacteria.

2. In a process for the fermentation of cellulosic materials, the step which comprises inoculating a fermentable mash containing approximately 40–80% of the cellulosic material in the form of xylose residue and 60–20% in the form of corn stalks with acid-producing thermophilic bacteria.

3. In the process for the fermentation of cellulosic materials, the step which comprises inoculating a fermentable mash containing approximately 40% of the cellulosic material in the form of xylose residue and 60% in the form of ground corn stalks with acid-producing thermophilic bacteria.

4. In a process for the fermentation of cellulosic materials, the improvement which comprises subjecting a fermentable mash containing cellulosic materials in the form of xylose residue and corn stalks to the action of acid-producing thermophilic bacteria capable of fermenting cellulose while controlling the acidity of the mash by the employment of compounds chosen from the group consisting of the alkaline-reacting alkali metal compounds and ammonium compounds so that the hydrogen ion concentration is maintained within the limits pH 5 and pH 9 measured in the bulk of the mash.

5. In a process for the fermentation of cellulosic materials, the improvement which comprises subjecting a fermentable mash containing distillery wastes and cellulosic materials in the form of xylose residue and corn stalks to the action of acid-producing thermophilic bacteria capable of fermenting cellulose while controlling the acidity of the mash by the employment of compounds chosen from the group consisting of the alkaline-reacting alkali metal compounds and ammonium compounds so that the hydrogen ion concentration is maintained within the limits pH 5 and pH 9 measured in the bulk of the mash, the temperature of the said mash being 45°–70° C.

6. In a process for the fermentation of cellulosic materials, the improvement which comprises subjecting a fermentable mash containing butyl-acetonic fermentation slop and cellulosic materials in the form of xylose residue and corn stalks to the action of acid-producing thermophilic bacteria capable of fermenting cellulose while controlling the acidity of the mash by the employment of compounds chosen from the group consisting of the alkaline-reacting alkali metal compounds and ammonium compounds so that the hydrogen ion concentration is maintained within the limits pH 5 and pH 9 measured in the bulk of the mash, the temperature of the said mash being 45°–70° C.

7. In a process for the fermentation of cellulosic materials, the improvement which comprises subjecting a fermentable mash containing butyl-acetonic fermentation slop and cellulosic materials in the form of 40–80% of xylose residue and 60–20% of corn stalks to the action of acid-producing thermophilic bacteria capable of fermenting cellulose while controlling the acidity of the mash by the employment of compounds chosen from the group consisting of the alkaline-reacting alkali metal compounds and ammonium compounds so that the hydrogen ion concentration is maintained within the limits pH 5 and pH 9 measured in the bulk of the mash, the temperature of the said mash being 45°–70° C.

8. In a process for the fermentation of cellulosic materials, the improvement which comprises subjecting the fermentable mash containing cellulosic materials in the form of xylose residue and corn stalks to the action of acid-producing thermophilic bacteria obtained from the fecal matter of a herbivorous animal capable of fermenting cellulose, and allowing fermentation to take place while controlling the acidity of the mash by the employment of compounds chosen from the group consisting of the alkaline-reacting alkali metal compounds and ammonium compounds so that the hydrogen ion concentration is maintained within the limits pH 5 and pH 9 measured in the bulk of the mash.

9. In a process for the fermentation of cellulosic materials, the improvement which comprises subjecting the fermentable mash containing cellulosic materials in the form of xylose residue and corn stalks to the action of acid-producing thermophilic bacteria obtained from the fecal matter of a goat and capable of fermenting cellulose, and allowing fermentation to take place while controlling the acidity of the mash by the employment of compounds chosen from the group consisting of the alkaline-reacting alkali metal compounds and ammonium compounds so that the hydrogen ion concentration is maintained within the limits pH 5 and pH 9 measured in the bulk of the mash.

10. In a process for the fermentation of cellulosic materials, the improvement which comprises subjecting a fermentable mash containing butyl-acetonic fermentation slop, cellulosic materials in the form of xylose residue and corn stalks to the action of acid-producing thermophilic bacteria obtained from the fecal matter of a herbivorous animal capable of fermenting cellulose, and allowing fermentation to take place while controlling the acidity of the mash by the employment of compounds chosen from the group consisting of the alkaline-reacting alkali metal compounds and ammonium compounds so that the hydrogen ion concentration is maintained within the limits pH 5 and pH 9 measured in the bulk of the mash.

11. In a process for the fermentation of cellulosic materials, the improvement which comprises subjecting fermentable mash containing butyl-acetonic fermentation slop and cellulosic materials in the form of 40–80% xylose residue and 60–20% of corn stalks to the action of acid-producing thermophilic bacteria obtained from the fecal matter of a herbivorous animal capable of fermenting cellulose, and allowing fermentation to take place while controlling the acidity of the mash by the employment of compounds chosen from the group consisting of the alkaline-reacting alkali metal compounds and ammonium compounds so that the hydrogen ion concentration is maintained within the limits pH 5 and pH 9 measured in the bulk of the mash.

In testimony whereof I affix my signature.

LEO M. CHRISTENSEN.